(12) United States Patent
Okada

(10) Patent No.: US 8,256,883 B2
(45) Date of Patent: *Sep. 4, 2012

(54) WATER BASED INK FOR INK-JET RECORDING, INK CARTRIDGE, INK-JET RECORDING APPARATUS, METHOD OF EVALUATING WATER-BASED INK FOR INK-JET RECORDING, AND METHOD OF PRODUCING WATER-BASED INK FOR INK-JET RECORDING

(75) Inventor: Goro Okada, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 718 days.

This patent is subject to a terminal disclaimer.

(21) Appl. No.: 12/413,736

(22) Filed: Mar. 30, 2009

(65) Prior Publication Data

US 2009/0244142 A1 Oct. 1, 2009

(30) Foreign Application Priority Data

Mar. 31, 2008 (JP) ................................. 2008-089290

(51) Int. Cl.
*G01D 11/00* (2006.01)

(52) U.S. Cl. ......................... 347/100; 347/95; 106/31.13

(58) Field of Classification Search ............ 347/95–100, 347/102; 106/31.13, 31.27, 31.6; 523/160, 523/161

See application file for complete search history.

(56) References Cited

U.S. PATENT DOCUMENTS

| | | | |
|---|---|---|---|
| 4,838,940 | A | 6/1989 | Kan et al. |
| 5,100,468 | A | 3/1992 | Yuasa et al. |
| 6,132,124 | A | 10/2000 | Ogura et al. |
| 2007/0201917 | A1 | 8/2007 | Teshigawara |

FOREIGN PATENT DOCUMENTS

| | | | |
|---|---|---|---|
| EP | 0 292 991 A3 | | 5/1988 |
| EP | 0 292 991 A3 | | 11/1988 |
| JP | 01-190774 | | 7/1988 |
| JP | 63-297476 | | 12/1988 |
| JP | 01-190773 | | 7/1989 |
| JP | 01-190774 | | 7/1989 |
| JP | 01-190775 | | 7/1989 |
| JP | 11-228885 | | 8/1999 |
| JP | 2002-097391 | | 4/2002 |
| JP | 2002097391 A | * | 4/2002 |

* cited by examiner

*Primary Examiner* — Matthew Luu
*Assistant Examiner* — Rut Patel
(74) *Attorney, Agent, or Firm* — Banner & Witcoff, Ltd.

(57) ABSTRACT

A water-based ink for ink-jet recording includes a coloring agent, water, and a water-soluble organic solvent. In the water-based ink after drying, a phase (δ) obtained by a tan δ measured at about 25° C. is constantly about 45 degrees or more. In other words, the phase (δ) never becomes less than about 45 degrees at a strain amount of about 0.1% to about 100%.

10 Claims, 2 Drawing Sheets

WATER BASED INK FOR INK-JET RECORDING, INK CARTRIDGE, INK-JET RECORDING APPARATUS, METHOD OF EVALUATING WATER-BASED INK FOR INK-JET RECORDING, AND METHOD OF PRODUCING WATER-BASED INK FOR INK-JET RECORDING

CROSS-REFERENCE TO RELATED APPLICATION

This application claims priority from Japanese Patent Application No. 2008-089290 filed on Mar. 31, 2008. The entire subject matter of the Japanese Patent Application is incorporated herein by reference.

BACKGROUND

Conventionally, a water-based ink comprising a coloring agent, water, and a water-soluble organic solvent is used widely as a water-based ink for ink-jet recording. The water-based ink is required to be good in ejection stability.

In order to improve the ejection stability, control of rheologic properties of a water-based ink is proposed. The water-based ink is composed of the same components as a rheology measurement ink whose loss tangent (tan δ) measured in a condition, in which an angular frequency is 3 rad/sec and strain is 10%, is 2.5 or more. However, even with respect to the aforementioned water-based ink, the ejection stability was not sufficiently improved.

SUMMARY

A water-based ink for ink-jet recording comprises a coloring agent, water, and a water-soluble organic solvent. In the water-based ink after drying, a phase (δ) obtained by a tan δ at a strain amount of about 0.1% to about 100% measured at about 25° C. is constantly about 45 degrees or more. In other words, the phase (δ) never becomes less than about 45 degrees at a strain amount of about 0.1% to about 100%.

An ink cartridge comprises the water-based ink for ink-jet recording.

An ink-jet recording apparatus comprises an ink storing portion; and an ink ejecting unit. An ink stored in the ink storing portion is ejected by the ink ejecting unit. The ink cartridge is stored in the ink storing portion.

A method of evaluating a water-based ink for ink-jet recording comprises a drying process for drying the water-based ink; and a calculation process for calculating, at a temperature of about 25° C., a phase (δ) obtained by a tan δ of the water-based ink after drying at a strain amount of about 0.1% to about 100%.

A method of producing a water-based ink for ink-jet recording, comprising a coloring agent, water, and a water-soluble organic solvent, comprises an evaluation process; and a preparation process. In the evaluation process, after drying, an ink composition is decided so that a phase (δ) obtained by a tan δ at a strain amount of about 0.1% to about 100% measured at about 25° C. is constantly about 45 degrees or more. According to the decided ink composition, in the preparation process, the water-based ink is prepared.

DETAILED DESCRIPTION

Figure 1:
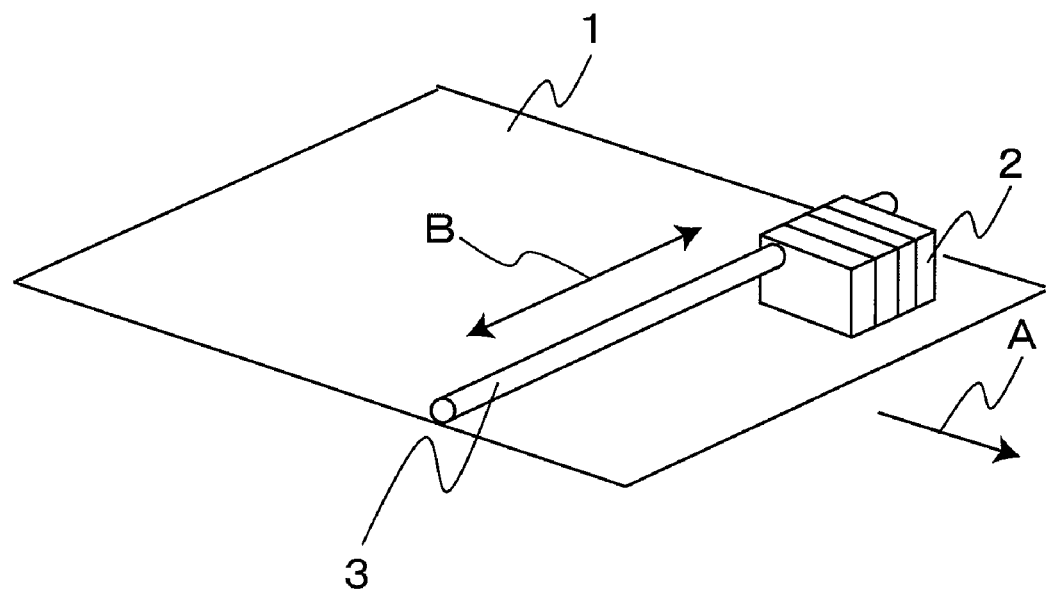
FIG. 1 is a view schematically showing an example of recording in the ink-jet recording apparatus using a serial-type ink-jet head.

In the water-based ink for ink-jet recording (hereinafter also may simply be referred to as "ink" or "water-based ink"), for example, the phase (δ) after drying in at least one of the following condition (I) and condition (II) is constantly about 45 degrees or more. Further, in a method of evaluating the water-based ink for ink-jet recording, in the drying process, the water-based ink is dried in at least one of the following condition (I) and condition (II), for example. Moreover, in a method of producing the water-based ink for ink-jet recording, in the evaluation process, an ink composition is decided so that the phase (δ) after drying in at least one of the condition (I) and condition (II) is constantly about 45 degrees or more, for example. However, a drying condition of the water-based ink is not limited to the condition (I) and condition (II). In the condition (I) and condition (II), for example, a temperature is about 60° C. and a relative humidity is about 40%.

Condition (I): leave about 1 g to about 10 g of water-based ink at rest under a condition, in which a temperature is about 50° C. to about 70° C. and a relative humidity is about 30% to about 50%, wherein decrease in weight of the water-based ink becomes about 0.01 g or less relative to the water-based ink of 24 hours ago when the weight of the water-based ink is measured every 24 hours.

Condition (II): leave water-based ink at rest under a condition, in which a temperature is about 50° C. to about 70° C. and a relative humidity is about 30% to about 50%, for about 7 days (about 168 hours) or more.

The tan δ is represented by the following Equation (1). According to the following Equation (1), when the phase (δ) is 45 degrees or more, a storage elastic modulus (G') is equal to or less than a loss elastic modulus (G").

$$\tan \delta = G''/G' \quad (1)$$

tan δ: loss tangent
G': storage elastic modulus
G": loss elastic modulus

"Frequency (1/sec)" is synonymous with an angular frequency (angular rate) and the unit thereof may be described as "rad/sec".

As described above, in the water-based ink for ink-jet recording, a phase (δ) obtained by a tan δ at a strain amount of about 0.1% to about 100% measured at about 25° C. after drying is constantly about 45 degrees or more. By making the phase (δ), which is obtained by the tan δ at the strain amount of about 0.1% to about 100%, being constantly about 45 degrees or more, a water-based ink of good ejection stability may be obtained. For example, a mechanism for improving the ejection stability is estimated as follows. As described above, in the water-based ink, the phase (δ) of the water-based ink after drying is constantly about 45 degrees or more at the strain amount of about 0.1% to about 100%. When the phase (δ) is 45 degrees or more, as described above, a storage elastic modulus (G') is equal to or smaller than a loss elastic modulus (G"). In this manner, in the water-based ink after drying, the loss elastic modulus (G"), a viscous component, of the water-based ink is larger than or substantially equal to the storage elastic modulus (G'), an elastic component, of the water-based ink. Therefore, with respect to the water-based ink, even in a case where water evaporation is generated in the vicinity of a nozzle of an ink-jet head and is dried, the water-based ink is good in the fluidity. As a result, use of the water-based ink makes it possible to improve the ejection stability. However, this mechanism for improving the ejection stability is estimation and does not limit the present invention at all. The phase (δ) obtained by the tan δ at the strain amount of about 0.1% to about 100% is, for example, constantly about 60 degrees or more, constantly about 70 degrees or more, and constantly about 75 degrees or more. The maximum value (upper limit value) of the phase (δ) is 90 degrees.

The tan δ at the strain amount of about 0.1% to about 100% may be measured using a commercially available viscoelasticity measurement apparatus (rheometer). The viscoelasticity measurement apparatus is not particularly limited, and examples thereof include "MCR 301 type" (trade name) manufactured by Anton Paar GmbH; and the like. The viscoelasticity measurement apparatus measures a relationship between a strain amount and a tan δ, and calculates a phase (δ) from the tan δ.

The tan δ at the strain amount of about 0.1% to about 100% may be measured as follows, for example. That is, first, the water-based ink after drying is produced. Next, a relationship between a strain amount and a tan δ of the water-based ink after drying is measured at about 25° C. using the viscoelasticity measurement apparatus. However, a method of measuring tan δ at the strain amount of about 0.1% to about 100% is not limited to this example.

The water-based ink for ink-jet recording and the ink cartridge may be applied to an ink-jet recording apparatus comprising a line-type ink-jet head. The line-type ink-jet head has a recording width equal to or wider than a width of a recording medium such as a recording paper and performs recording in a width direction of the recording medium all at once in a condition where the line-type ink-jet head is fixed. In contrast, a serial-type ink-jet head performs recording by moving the ink-jet head itself in the width direction of the recording medium. Since a recording width of the ink-jet recording apparatus using the line-type ink-jet head is wide, a recording speed of the ink-jet recording apparatus using the line-type ink-jet head is considerably faster than that of the ink-jet recording apparatus using the serial-type ink-jet head. The water-based ink for ink-jet recording and the ink cartridge hardly generate the delay of ink ejection, are good in ejection stability, and perform efficient ink-jet recording even in a case where they are applied to the ink-jet recording apparatus comprising the line-type ink-jet head. The "recording" includes recording/printing of letters, images, and the like.

In the ink-jet recording apparatus, the ink ejecting unit may comprise a line-type ink-jet head.

In the ink-jet recording apparatus, a recording speed is not particularly limited.

In the ink-jet recording apparatus, a recording width is not particularly limited. The recording width is a width in which recording is performed on a recording medium such as a recording paper all at once in the ink-jet recording apparatus.

Next, the water-based ink for ink-jet recording is explained. Composition of the water-based ink is not limited as long as the water-based ink comprises a coloring agent, water, and a water-soluble organic solvent, and a phase (δ) obtained by the tan δ at the strain amount of about 0.1% to about 100% is constantly about 45 degrees or more.

The coloring agent is not particularly limited, and may be any of a dye or a pigment. Further, as the coloring agent, a mixture of a dye and a pigment may be used.

The pigment is not particularly limited. For example, carbon black, an inorganic pigment, an organic pigment, and the like may be used. Examples of the carbon black include furnace black, lamp black, acetylene black, channel black, and the like. Examples of the inorganic pigment include titanium oxide, iron oxide inorganic pigment, carbon black inorganic pigment, and the like. Examples of the organic pigment include an azo pigment such as azo lake, an insoluble azo pigment, a condensed azo pigment, a chelate azo pigment; a polycyclic pigment such as a phthalocyanine pigment, a perylene and perynone pigment, an anthraquinone pigment, a quinacridone pigment, a dioxazine pigment, a thioindigo pigment, an isoindolinone pigment, a quinophthalone pigment, and the like; a dye lake pigment such as a basic dye lake pigment, an acid dye lake pigment, and the like; a nitro pigment; a nitroso pigment; an aniline black daylight fluorescent pigment; and the like. Further, other pigments may be used as long as they are dispersible to an aqueous phase. Examples of the pigments include C. I. Pigment Black 1, 6, and 7; C. I. Pigment Yellow 1, 2, 3, 12, 13, 14, 15, 16, 17, 55, 73, 74, 75, 83, 93, 94, 95, 97, 98, 114, 128, 129, 138, 150, 151, 154, 180, 185, and 194; C. I. Pigment Orange 31 and 43; C. I. Pigment Red 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blue 1, 2, 3, 15, 15:1, 15:2, 15:3, 15:4, 16, 22, and 60; C. I. Pigment Green 7 and 36; and the like.

The pigment includes a pigment applied with a surface modification such as a self-dispersed pigment. The pigment applied with the surface modification is a pigment, the surface thereof is treated with a specific functional group.

A ratio of the pigment relative to the total amount of the water-based ink (pigment ratio) is not particularly limited and may be, for example, decided suitably according to desired optical density, color, or the like. The pigment ratio is, for example, in the range of about 0.1 wt % to about 20 wt %, and in the range of about 0.3 wt % to about 15 wt %. One of the pigments may be used alone or two or more of them may be used in combination.

The dye is not particularly limited and examples thereof include a water-soluble dye such as a direct dye, an acid dye, a basic dye, a reactive dye, and the like; and the like. Examples of the dye include C. I. Direct Black, C. I. Direct Blue, C. I. Direct Red, C. I. Direct Yellow, C. I. Direct Orange, C. I. Direct Violet, C. I. Direct Brown, C. I. Direct Green, C. I. Acid Black, C. I. Acid Blue, C. I. Acid Red, C. I. Acid Yellow, C. I. Acid Orange, C. I. Acid Violet, C. I. Basic Black, C. I. Basic Blue, C. I. Basic Red, C. I. Basic Violet, C. I. Food Black, and the like. Examples of the C. I. Direct Black include C. I. Direct Black 17, 19, 32, 51, 71, 108, 146, 154, 168, and the like. Examples of the C. I. Direct Blue include C.I. Direct Blue 6, 22, 25, 71, 86, 90, 106, 199, and the like. Examples of the C. I. Direct Red include C. I. Direct Red 1, 4, 17, 28, 83, 227, and the like. Examples of the C. I. Direct Yellow include C. I. Direct Yellow 12, 24, 26, 86, 98, 132, 142, 173, and the like. Examples of the C. I. Direct Orange include C. I. Direct Orange 34, 39, 44, 46, 60, and the like. Examples of the C. I. Direct Violet include C. I. Direct Violet 47, 48, and the like. Examples of the C. I. Direct Brown include C. I. Direct Brown 109, and the like. Examples of the C. I. Direct Green include C. I. Direct Green 59, and the like. Examples of the C. I. Acid Black include C. I. Acid Black 2, 7, 24, 26, 31, 52, 63, 112, 118, and the like. Examples of the C. I. Acid Blue include C.

I. Acid Blue 9, 22, 40, 59, 93, 102, 104, 117, 120, 167, 229, 234, and the like. Examples of the C. I. Acid Red include C. I. Acid Red 1, 6, 32, 37, 51, 52, 80, 85, 87, 92, 94, 115, 180, 256, 289, 315, 317, and the like. Examples of the C. I. Acid Yellow include C. I. Acid Yellow 11, 17, 23, 25, 29, 42, 61, 71, and the like. Examples of the C. I. Acid Orange include C. I. Acid Orange 7, 19, and the like. Examples of the C. I. Acid Violet include C. I. Acid Violet 49, and the like. Examples of the C. I. Basic Black include C. I. Basic Black 2, and the like. Examples of the C. I. Basic Blue include C. I. Basic Blue 1, 3, 5, 7, 9, 24, 25, 26, 28, 29, and the like. Examples of the C. I. Basic Red include C. I. Basic Red 1, 2, 9, 12, 13, 14, 37, and the like. Examples of the C. I. Basic Violet include C. I. Basic Violet 7, 14, 27, and the like. Examples of the C. I. Food Black include C. I. Food Black 1, 2, and the like. These dyes are good in characteristics such as, vividness, water solubility, stability, and the like.

A ratio of the dye relative to the total amount of the water-based ink (dye ratio) is not particularly limited and is, for example, in the range of about 0.1 wt % to about 20 wt %. One of the dyes may be used alone or two or more of them may be used in combination.

The water may be ion-exchange water or purified water. A ratio of the water relative to the total amount of the water-based ink (water ratio) is decided suitably according to desired ink characteristics. The ratio of the water may be a balance of the other components, for example.

The water-soluble organic solvent is classified into a humectant and a penetrant. The humectant prevents ink from drying at a tip of an ink-jet head, for example. The penetrant adjusts a drying rate of ink on a recording medium, for example.

The humectant is not particularly limited. Examples of the humectant include lower alcohol such as methyl alcohol, ethyl alcohol, n-propyl alcohol, isopropyl alcohol, n-butyl alcohol, sec-butyl alcohol, tert-butyl alcohol, and the like; amide such as dimethylformamide, dimethylacetamide, and the like; ketone such as acetone, and the like; ketoalcohol such as diacetone alcohol, and the like; ether such as tetrahydrofuran, dioxane, and the like; polyalcohol such as polyalkylene glycol, alkylene glycol, glycerin, and the like; 2-pyrrolidone; N-methyl-2-pyrrolidone; 1,3-dimethyl-2-imidazolidinone; and the like. The polyalkylene glycol is not particularly limited and examples thereof include polyethylene glycol, polypropylene glycol, and the like. The alkylene glycol is not particularly limited and examples thereof include ethylene glycol, propylene glycol, butylene glycol, diethylene glycol, triethylene glycol, dipropylene glycol, tripropylene glycol, thiodiglycol, hexylene glycol, and the like. Among them, polyalcohol such as alkylene glycol and glycerin is preferable. One of the humectants may be used alone or two or more of them may be used in combination.

A ratio of the humectant relative to the total amount of the water-based ink (humectant ratio) is not particularly limited and is, for example, in the range of about 0 wt % to about 95 wt %, and in the range of about 10 wt % to about 80 wt %.

The penetrant is not particularly limited and an example thereof includes glycol ether. The glycol ether is not particularly limited and examples thereof include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, and the like. One of the penetrants may be used alone or two or more of them may be used in combination.

A ratio of the penetrant relative to the total amount of the water-based ink (penetrant ratio) is not particularly limited and is, for example, in the range of about 0 wt % to about 20 wt %. Setting of the penetrant ratio in the aforementioned range makes it possible to obtain suitable penetration of the water-based ink relative to a recording medium such as a recording paper. The penetrant ratio may be in the range of about 0.1 wt % to about 15 wt %, and in the range of about 0.5 wt % to about 10 wt %.

The water-based ink further may comprise a conventionally known additive as required. Examples of the additive include a surfactant, a viscosity modifier, a surface tension modifier, a mildewproofing agent, and the like. Examples of the viscosity modifier include, without limitation, polyvinyl alcohol, cellulose, water-soluble resin, and the like.

The water-based ink may be prepared by uniformly mixing a coloring agent, water, and a water-soluble organic solvent with other added components as required by a conventionally known method, and then removing insolubles with a filter, for example.

Next, the ink cartridge is explained. As described above, the ink cartridge comprises the water-based ink for ink-jet recording. As a body of the ink cartridge, for example, a conventionally known body may be used.

Next, the ink-jet recording apparatus is explained. The ink-jet recording apparatus comprises an ink storing portion and an ink ejecting unit. An ink stored in the ink storing portion is ejected by the ink ejecting unit. The ink cartridge is stored in the ink storing portion. Other than this, the ink-jet recording apparatus may have the construction similar to that of a conventionally known ink-jet recording apparatus.

The ink ejecting unit is not particularly limited and may comprise a conventionally known serial-type ink-jet head or line-type ink-jet head. As described above, the ink ejecting unit may comprise a line-type ink-jet head.

FIG. 1 schematically shows an example of recording in the ink-jet recording apparatus using a serial-type ink-jet head. In this example, a serial-type ink-jet head 2 ejects the water-based ink for ink-jet recording supplied from the ink cartridge (not shown) onto a recording medium 1 such as a recording paper. As indicated by an arrow B, the serial-type ink-jet head 2 moves perpendicular to a traveling direction (arrow A) of the recording medium 1 along a carriage 3 by a drive mechanism (not shown). Thereby, recording relative to the recording medium 1 is performed. A water-based ink for ink-jet recording of each color is sequentially ejected onto the recording medium 1 by the serial-type ink-jet head 2. Thereby, the water-based ink for ink-jet recording of each color is mixed and a color based on image information is expressed on the recording medium 1. However, the ink-jet recording apparatus is not limited thereto.

Figure 2:
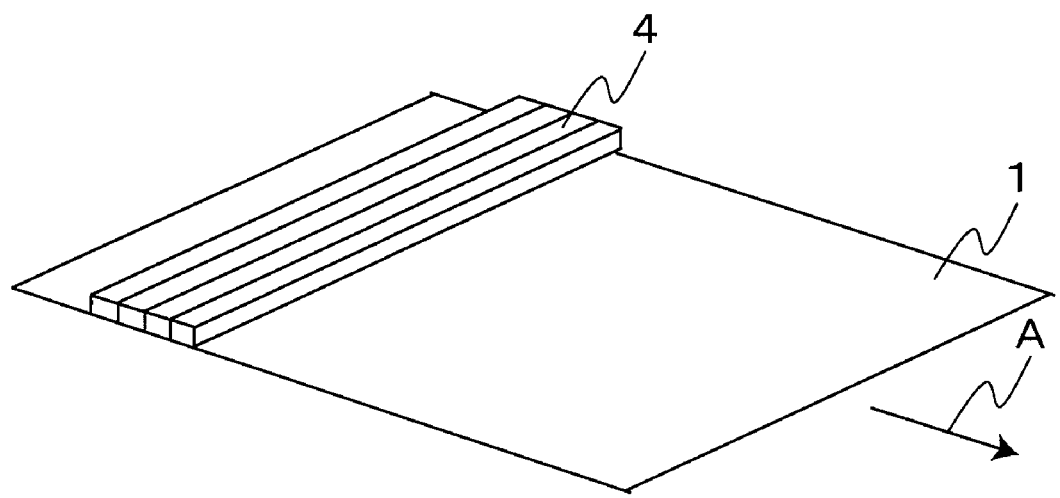
FIG. 2 is a view schematically showing an example of recording in the ink-jet recording apparatus using a line-type ink-jet head.

FIG. 2 schematically shows an example of recording in the ink-jet recording apparatus using a line-type ink-jet head. In this example, a line-type ink-jet head 4 ejects the water-based ink for ink-jet recording supplied from the ink cartridge (not shown) onto a recording medium 1 such as a recording paper. The line-type ink-jet head 4 has a width equal to or wider than a width of the recording medium 1 (a length of the recording medium 1 in a direction perpendicular to a traveling direction). Therefore, with respect to this ink-jet recording apparatus, recording in a width direction of the recording medium 1 is performed all at once in a condition where the line-type ink-jet head 4 is fixed. As a result, with respect to this ink-jet recording apparatus, as compared to the ink-jet recording apparatus which performs recording by moving the serial-type ink-jet head 2 on the recording medium 1, a recording speed is considerably fast. A water-based ink for ink-jet recording of each color is sequentially ejected onto the recording medium 1 by the line-type ink-jet head 4. Thereby, the water-based ink for ink-jet recording of each color is mixed and a color based on image information is expressed on the recording medium 1. However, the ink-jet recording apparatus is not limited thereto.

An example of an ejecting method in the ink ejecting unit includes a piezoelectric element method. In the piezoelectric element method, the water-based ink is ejected due to mechanical vibration or displacement (strain) to the water-based ink by piezoelectric element.

Next, a method of evaluating the water-based ink for ink-jet recording is explained. As described above, the method of evaluating comprises a drying process for drying a water-based ink; and a calculation process for calculating, at a temperature of about 25° C., a phase (δ) obtained by a tan δ at a strain amount of about 0.1% to about 100% of the water-based ink after drying. The method of evaluating may be performed by measuring, at a temperature of about 25° C., a tan δ of the water-based ink after drying at a strain amount of about 0.1% to about 100% using the viscoelasticity measurement apparatus, and calculating a phase (δ) from the tan δ. According to the method of evaluating, for example, at a temperature of about 25° C., a water-based ink whose phase (δ) at the strain amount of about 0.1% to about 100% of the water-based ink after drying is constantly about 45 degrees or more is determined as a water-based ink of good ejection stability. Other conditions of the method of evaluating are similar to that of the water-based ink for ink-jet recording.

Next, a method of producing the water-based ink for ink-jet recording is explained. As described above, the method of producing the water-based ink for ink-jet recording comprises a coloring agent, water and a water-soluble organic solvent. The method comprises an evaluation process and a preparation process. In the evaluation process, after drying, an ink composition is decided so that a phase (δ) obtained by a tan δ at a strain amount of about 0.1% to about 100% measured at about 25° C. is constantly about 45 degrees or more. According to the decided ink composition, in the preparation process, the water-based ink is prepared. According to the method of producing, a water-based ink of good ejection stability may be obtained. Other conditions of the method of producing are similar to that of the water-based ink for ink-jet recording.

EXAMPLES

Examples of the present invention are described together with Comparative Examples, which are provided for illustrative purposes only. The present invention is not limited by the following Examples and Comparative Examples.

Examples 1 to 4

Ink composition summarized in Table 1 were stirred and mixed. Thereafter, the obtained mixture was filtered with a cellulose acetate type membrane filter having a pore diameter of 3 μm manufactured by ToyoRoshi Kaisha, Ltd. to prepare a water-based ink for ink-jet recording of Examples 1 to 4.

Comparative Example 1

A water-based ink filled in an ink cartridge for ink-jet recording printer, "ICBK46" (trade name), manufactured by SEIKO EPSON CORPORATION. was used as a water-based ink for ink-jet recording of this Comparative Example.

Comparative Example 2

A water-based ink filled in an ink cartridge for a color label printer, "BJI-P 705 BK200" (trade name), manufactured by Canon Inc. was used as a water-based ink for ink-jet recording of this Comparative Example.

Characteristics and properties of the water-based ink of each Example and each Comparative Example were evaluated or measured according to the following method.
(1) Relationship between Strain Amount and Phase (δ) of Water-Based Ink after Drying at Temperature of 25° C.
(1-1) Produce of Water-based Ink after Drying 5 g of water-based ink was introduced to an open bottle (bore diameter: 20.2 mm) and left at rest in a temperature-controlled chamber, in which a temperature is 60° C. and a relative humidity is 40%, and was dried until the weight of the water-based ink being decreased by 0.01 g or less relative to the weight of the water-based ink of 24 hours ago when the weight of the water-based ink was measured every 24 hours. As a result, in all Examples and Comparative Examples, time required for drying was about 7 days (168 hours). In this manner, a water-based ink after drying was prepared.
(1-2) Relationship between Strain Amount and Phase (δ) of Water-based Ink after Drying at Temperature of 25° C.

Next, using an optimal amount of water-based ink after drying, in the following condition, a relationship between a strain amount and a tan δ of a water-based ink after drying was measured, and a phase (δ) was calculated from the tan δ.
<Measurement Condition>
Measurement apparatus: Viscoelasticity measurement apparatus manufactured by Anton Paar GmbH, "MCR 301 type" (trade name)
Measurement jig: Cone-plate (diameter: 50 mm)
Measurement temperature: 25° C.
Frequency: 10 (1/sec)
(2) Ejection Stability Ejection stability was evaluated in accordance with the following criteria by performing continuous recording of 100 million dots using an ink-jet recording apparatus using a line-type ink-jet head shown in FIG. 2. An office paper W manufactured by FUJITSU CoWorCo LIMITED was used as a recording medium.
Ejection Stability Evaluation Criteria
G: Neither unejection nor ejection deflection occurred during the continuous recording, or slight unejection and/or ejection deflection occurred during the continuous recording but the unejection and/or ejection deflection was restored by five purges or fewer.
NG: Unejection and ejection deflection occurred many times during the continuous recording and the unejection and ejection deflection were not restored by five purges.

Figure 3:
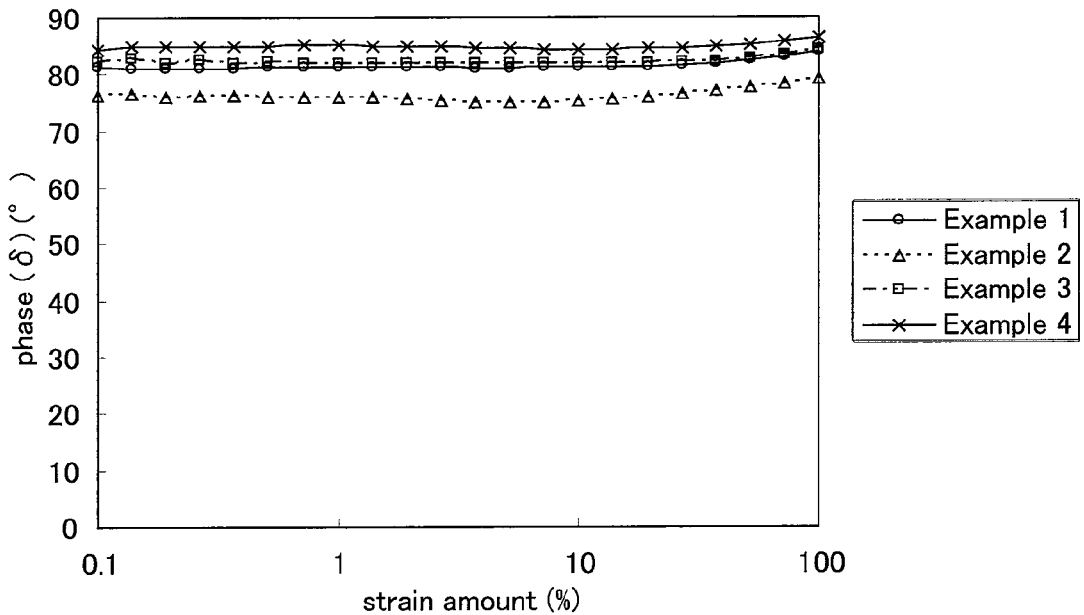
FIG. 3 is a graph showing a relationship between a strain amount and a phase (δ) of a water-based ink after drying at a measurement temperature of 25° C. in Example.
Figure 4:
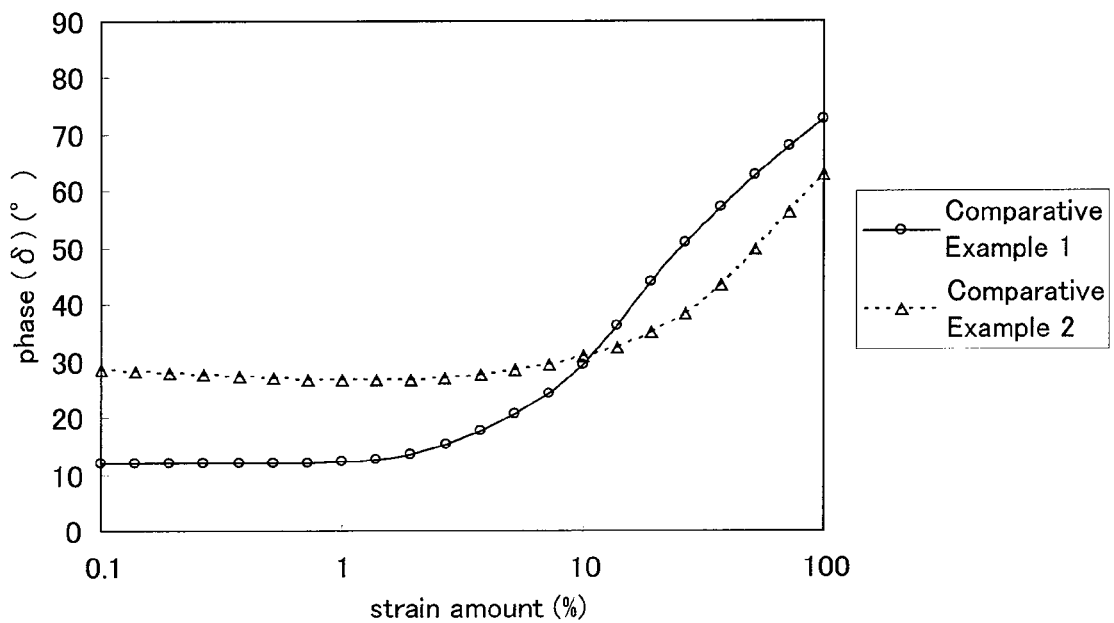
FIG. 4 is a graph showing a relationship between a strain amount and a phase (δ) of a water-based ink after drying at a measurement temperature of 25° C. in Comparative Example.

Ink composition and evaluation results of the ejection stability of each Example are summarized in Table 1. Evaluation results of the ejection stability of each Comparative Example are summarized in Table 2. FIG. 3 shows a relationship between a strain amount and a phase (δ) of a water-based ink after drying at a measurement temperature of 25° C. in Examples 1 to 4. FIG. 4 shows a relationship between a strain amount and a phase (δ) of a water-based ink after drying at a measurement temperature of 25° C. in Comparative Examples 1 and 2.

TABLE 1

| INK COMPOSITION (wt %) | Example 1 | Example 2 | Example 3 | Example 4 |
|---|---|---|---|---|
| CAB-O-JET ® 300 (1*) | 33.33 | 26.67 | 33.33 | 20.00 |
|  | (5.0) | (4.0) | (5.0) | (3.0) |
| Glycerin | 21.25 | 29.75 | 25.50 | 25.50 |
| Dipropylene glycol-n-propyl ether | 1.50 | 1.25 | 1.25 | 1.25 |
| Propylene glycol monopropyl ether | 1.00 | — | — | — |
| SUNNOL ® DL1430 (2*) | 0.12 | 1.42 | 1.42 | 1.42 |
| Triethanol amine | 0.10 | 0.10 | 0.10 | 0.10 |
| PROXEL GXL(S) (3*) | 0.13 | 0.14 | 0.14 | 0.14 |
| Purified water | Balance | Balance | Balance | Balance |
| Phase ($\delta$) obtained by tan $\delta$ at strain amount of 0.1% to 100% | 81.0°-84.1° | 76.1°-79.3° | 81.8°-84.3° | 84.4°-86.3° |
| Ejection Stability Evaluation | G | G | G | G |

(1*) self-dispersing black pigment manufactured by Cabot Specialty Chemicals, Inc., pigment solid content: 15 wt %
(2*) polyoxyethylene alkyl ether sulfate type surfactant, manufactured by Lion Corporation
(3*) dipropylene glycol solution containing 1,2-benzisothiazolin-3-on (20 wt %) manufactured by Arch Chemicals Japan
*numeric value in grouping symbol of CAB-O-JET ® 300 indicates a carbon black concentration (solid content) in a total amount of the water-based ink

TABLE 2

|  | Comparative Example 1 | Comparative Example 2 |
|---|---|---|
| Phase ($\delta$) obtained by tan$\delta$ at strain amount of 0.1% to 100% | 11.9°-72.8° | 26.5°-62.9° |
| Ejection Stability Evaluation | NG | NG |

As shown in FIGS. 3 and 4 and Tables 1 and 2, in Examples 1 to 4, a phase ($\delta$) of a water-based ink after drying at a strain amount of 0.1% to 100% in a temperature of 25° C. was constantly 45 degrees or more. On the other hand, in Comparative Examples 1 and 2, a phase ($\delta$) of a water-based ink after drying at a temperature of 25° C. was sometimes less than 45 degrees at a strain amount of 0.1% to 100%. Each water-based ink of Examples 1 to 4 was good in ejection stability. On the other hand each water-based ink of Comparative Examples 1 and 2 was inferior in ejection stability.

It will be obvious to those having skill in the art that many changes may be made in the above-described details of the particular aspects described herein without departing from the spirit or scope of the invention as defined in the appended claims.

What is claimed is:

1. A water-based ink for ink jet recording comprising a coloring agent, water, and a water-soluble organic solvent, wherein
in the water-based ink after drying, a phase ($\delta$) obtained by a tan $\delta$ at a strain amount of about 0.1% to about 100% measured at about 25° C. is constantly about 45 degrees or more; and
wherein the phase ($\delta$) after drying in at least one of the following condition (I) and condition (II) is constantly about 45 degrees or more:
Condition (I): leave about 1 g to about 10 g of water-based ink at rest under a condition, in which a temperature is about 50° C. to about 70° C. and a relative humidity is about 30% to about 50%, wherein decrease in weight of the water-based ink becomes about 0.01 g or less relative to the water-based ink of 24 hours ago when the weight of the water-based ink is measured every 24 hours;
Condition (II): leave water-based ink at rest under a condition, in which a temperature is about 50° C. to about 70° C. and a relative humidity is about 30% to about 50%, for about 7 days or more.

2. The water-based ink for ink jet recording according to claim 1, wherein in the condition (I) and condition (II), a temperature is about 60° C. and a relative humidity is about 40%.

3. The water-based ink for ink jet recording according to claim 1, wherein the water-based ink is used for an ink jet recording apparatus comprising a line-type ink-jet head.

4. An ink cartridge comprising a water-based ink for ink jet recording, wherein the water-based ink is a water-based ink for ink jet recording according to claim 1.

5. An ink jet recording apparatus comprising:
an ink storing portion; and
an ink ejecting unit, an ink stored in the ink storing portion being ejected by the ink ejecting unit, wherein
an ink cartridge according to claim 4 is stored in the ink storing portion.

6. The ink jet recording apparatus according to claim 5, wherein the ink ejecting unit comprises a line-type ink-jet head.

7. A method of evaluating a water-based ink for ink jet recording comprising:
a drying process for drying the water-based ink; and
a calculation process for calculating, at a temperature of about 25° C., a phase ($\delta$) obtained by a tan $\delta$ of the water-based ink after drying at a strain amount of about 0.1% to about 100%; and
wherein in the drying process, the water-based ink is dried in at least one of the following condition (I) and condition (II):
Condition (I): leave about 1 g to about 10 g of water-based ink at rest under a condition, in which a temperature is about 50° C. to about 70° C. and a relative humidity is about 30% to about 50%, wherein decrease in weight of the water-based ink becomes about 0.01 g or less relative to the water-based ink of 24 hours ago when the weight of the water-based ink is measured every 24 hours;
Condition (II): leave water-based ink at rest under a condition, in which a temperature is about 50° C. to about 70° C. and a relative humidity is about 30% to about 50%, for about 7 days or more.

8. The method of evaluating a water-based ink for ink jet recording according to claim 7, wherein in the condition (I) and condition (II), a temperature is about 60° C. and a relative humidity is about 40%.

9. A method of producing a water-based ink for ink jet recording comprising a coloring agent, water, and a water-soluble organic solvent, wherein the method comprises:
- an evaluation process; and
- a preparation process, wherein
   - in the evaluation process, after drying, an ink composition is decided so that a phase ($\delta$) obtained by a tan $\delta$ at a strain amount of about 0.1% to about 100% measured at about 25° C. is constantly about 45 degrees or more, and wherein
      - according to the decided ink composition, in the preparation process, the water-based ink is prepared; and
      - wherein in the evaluation process, an ink composition is decided so that the phase ($\delta$) after drying in at least one of the following condition (I) and condition (II) is constantly about 45 degrees or more:
         - Condition (I): leave about 1 g to about 10 g of water-based ink at rest under a condition, in which a temperature is about 50° C. to about 70° C. and a relative humidity is about 30% to about 50%, wherein decrease in weight of the water-based ink becomes about 0.01 g or less relative to the water-based ink of 24 hours ago when the weight of the water-based ink is measured every 24 hours;
         - Condition (II): leave water-based ink at rest under a condition, in which a temperature is about 50° C. to about 70° C. and a relative humidity is about 30% to about 50%, for about 7 days or more.

10. The method of producing a water-based ink for ink jet recording according to claim 9, wherein in the condition (I) and condition (II), a temperature is about 60° C. and a relative humidity is about 40%.

* * * * *